C. M. CONRADSON.
ART OF GRINDING INTERCHANGEABLE GROUND GLASS BOTTLE NECKS AND STOPPERS THEREFOR.
APPLICATION FILED JULY 25, 1907.
911,809.
Patented Feb. 9, 1909.
2 SHEETS—SHEET 1.
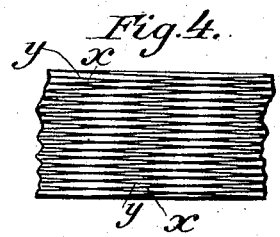
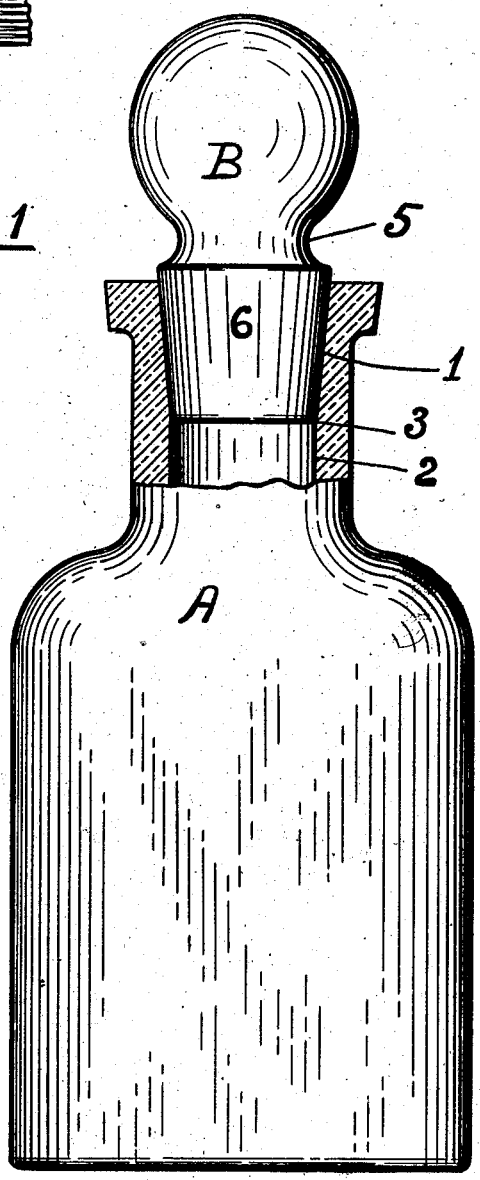
WITNESSES:
INVENTOR:
Conrad M. Conradson C. M. CONRADSON.
ART OF GRINDING INTERCHANGEABLE GROUND GLASS BOTTLE NECKS AND STOPPERS THEREFOR.
APPLICATION FILED JULY 25, 1907.
911,809.
Patented Feb. 9, 1909.
2 SHEETS—SHEET 2.
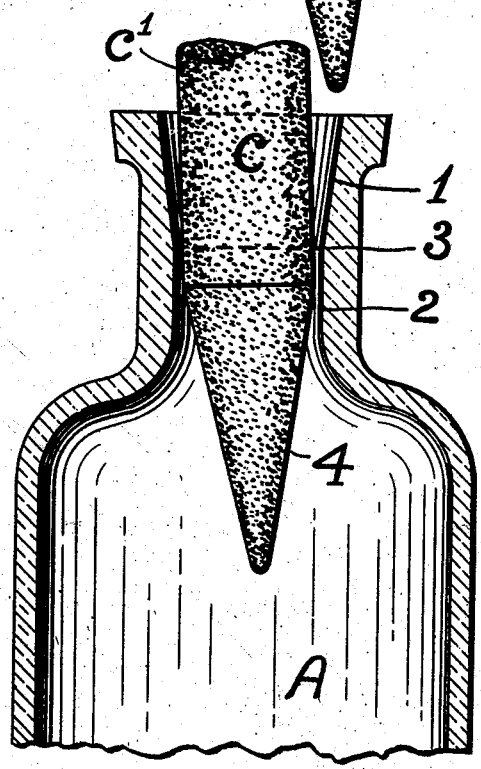
WITNESSES:
INVENTOR:
Conrad M. Conradson

UNITED STATES PATENT OFFICE.

CONRAD M. CONRADSON, OF MADISON, WISCONSIN, ASSIGNOR, BY MESNE ASSIGNMENTS, TO PRECISION GLASS GRINDING MACHINE COMPANY, OF SIOUX FALLS, SOUTH DAKOTA, A CORPORATION OF SOUTH DAKOTA.

ART OF GRINDING INTERCHANGEABLE GROUND-GLASS BOTTLE-NECKS AND STOPPERS THEREFOR.

No. 911,809.   Specification of Letters Patent.   Patented Feb. 9, 1909.

Application filed July 25, 1907. Serial No. 385,475.

*To all whom it may concern:*

Be it known that I, CONRAD M. CONRADSON, a citizen of the United States, residing at Madison, in the county of Dane and State of Wisconsin, have invented a new and useful Improvement in the Art of Grinding Interchangeable Ground-Glass Bottle-Necks and Stoppers Therefor, of which the following is a specification.

This invention relates to ground glass bottle-necks and ground glass stoppers therefor, and its object is to produce interchangeable ground glass bottle-necks and ground glass stoppers therefor, and to obviate the cumbersome and unduly expensive successive operations of the old art, the final result of which was, and is, the production of ground glass jointed bottle-necks and stoppers, of which no stopper properly fits any bottle other than the particular bottle with which it was originally mated, and of which no bottle properly fits any other stopper than the particular one with which it was originally mated.

The ground-glass joint-forming art, as it relates to bottles and stoppers, has long been, and is, substantially as follows:—The truncated, cone-shaped interior surface of the glass bottle-neck, and the truncated, cone-shaped exterior surface of the glass stopper, whether blown or formed in molds, are initially untrue with reference to the geometrical axis of the truncated cone; that is, to the lengthwise axes of the bottles and stoppers. The said surfaces are also more or less rough; that is, of a more or less irregular, hill-and-dale condition. The first operation in the prior art is to give approximately proper form to the said surfaces. In the case of the bottle-neck, a so-called "lapping" tool rotatably mounted in a machine has been used. This tool is cone-shaped, and generally consists of a wooden core spirally wrapped with sheet iron. The workman with one hand holds the bottle on the free end of the rotating "lap", moving the bottle-neck back and forth on the "lap", longitudinally, while with the other hand he feeds between the "lap" and bottle-neck interior an abrasive mixture. This initial manual "lapping" operation is usually carried on until the desired quantity of bottle-necks has been "lapped." The stoppers are primarily put in a rotating chuck and roughed out by means of a "lap", generally consisting of a copper-faced strip of wood one end of which is mechanically held, the workman with one hand pressing the free end of this "lap" against the rotating stopper surface while feeding with the other hand abrasive material between the stopper and the "lap." Leaving the stoppers, *seriatim*, in the chuck, the workman takes the bottles, *seriatim*, and holding a bottle, in one hand, with the other hand feeds abrasive mixture between the opposed surfaces of the stopper and bottle-neck, moving the bottle-neck back and forth over the stopper until the joint-forming surfaces of the bottle are mated.

On the best grade of work it is frequently the custom to put each stopper in its bottle, after the "lapping" operations and oscillate them in relation one to another by hand to perfect the tightness of joint. In this old art, said surfaces are in fact used as tools for their own production, one surface modifying the other in such wise that there is no reasonable likelihood of interchangeable mateability. Consequently, the further practice is to tie each stopper to its own bottle, so as to keep them together for storage and transportation, and for cleaning before shipment. In shipping, it is also usual to insert a bit of paper between each bottle-neck and its stopper, so as to prevent breakage. The jobbers and retailers also have to keep such bottles and stoppers in mated pairs, as received. By the old process, as a general rule, the said surfaces are neither properly round nor straight; and are therefore exceedingly apt to stick together; and the joints are not tight to the proof alcohol test except by careful manual grinding of each stopper in its own bottle. The practical resultant condition of the ground-glass joint art as it relates to bottles and stoppers is that the field of use thereof is comparatively restricted, such bottles and stoppers being unduly expensive and frequently unsatisfactory. It is a fact, moreover, that no one of said surfaces is uniformly finished, each surface being irregular at the best.

The advantages of the present invention are, elimination of the expense of time and labor of the old manual "lapping operation;"

and the production of interchangeable bottlenecks and stoppers, which may be shipped separately and used indiscriminately, size for size.

I have discovered that ground glass bottlenecks and ground glass stoppers can be made separately, and in such wise that ground glass stoppers of any given size will properly fit and form a tight joint with ground glass bottle-necks of corresponding size, and vice versa; making a non-interlocking, ground glass joint that is generally tight to the proof alcohol test.

My new method involves the use of a glass-grinding tool in effecting a series of changes or transformations of the joint-forming surfaces, and by my new method I can grind quantities of glass bottles or stoppers independently one of another, yet so accurately that the stoppers will be interchangeable with the bottles, and vice versa, and always a perfect fit, as stated.

My new method is not only more precise, but is very much more rapid than the old method of grinding the joint-forming surfaces.

In the drawings, illustrating the principle of my invention and the best mode now known to me of applying that principle, Figure 1 is a vertical section of a glass bottle with a stopper in place, the joint-forming surfaces being formed in accordance with my invention. Fig. 2 is a partial sectional elevation of a bottle with a glass-grinding implement, shown in two positions, the first position showing a grinding implement about to enter the bottle-neck and the second position showing the inner end portion of the grinding implement below the ground, joint-forming surface. Fig. 3 is a plan development of a ground glass-surface enlarged; and Fig. 4 is a plan development of the surface shown in Fig. 3 after being ground spirally and reversely.

Referring to the drawings,—in Fig. 1, A represents a glass bottle, and B a glass stopper; 1 is the inside ground or joint-forming surface of the bottle-neck, and 2 is the inside surface of the bottle-neck below the ground portion 1. As a matter of convenience, the ground surface 1 terminates abruptly at 3 with the unground portion 2.

In Fig. 1, 5 is the usual neck of the bottle-stopper B between the head of the stopper and the ground joint-forming surface 6 thereof.

In carrying out my method, I preferably provide a grinding implement of any proper form or contour, which may be in the form of a grinding pencil C, as shown. Such a pencil is shown in Fig. 2, in two positions; $C'$ indicating the maximum distance the grinding pencil C extends inside the bottle-neck, and $C^2$ the maximum distance the grinding pencil is withdrawn from the bottle in the operation of the grinding pencil. Of course, greater or less length of the longitudinal travel of the pencil than indicated by these two positions may be given it, if desired. This will depend on the breadth of the glass surface to be ground. The grinding pencil rotates, during its operation, in contact with the glass surface operated on, at a high rate of speed, and has preferably a reciprocating, endwise motion relative to the bottle and parallel with the side of the inside ground surface or stopper-seat 1, which may be conical, as shown, or of any other desired shape.

It is immaterial whether, during the grinding operation, the grinding implement reciprocates longitudinally or is rotated without such longitudinal movement, provided, in the latter case, the bottle or stopper is given lengthwise movement. If desired, both the bottle and the grinding implement may reciprocate during the rotation of the grinding implement, at which time the bottle preferably rotates at a comparatively low rate of speed, and preferably in the opposite direction to that in which the pencil rotates. The longitudinal movements of the bottle-neck or grinding implement in relation to one another are had with the operating surface of the grinding implement in contact with the glass surface to be ground. The ground glass surface of the stopper B, shown in Fig. 1, is ground in the same way as the inner surface 1 of the bottle-neck, the grinding implement rotating in contact with the exterior joint-forming surface of the stopper, and the stopper and implement, either or both having longitudinal movement at such time.

The abrasive or cutting surface of the grinding implement, during its movement in relation to the glass surface to be ground (or the longitudinal movement of said surface in relation, approximately, to the lengthwise axis of the grinding implement,) initially causes an approximately spiral furrowing $x$ of the surface. The reverse endwise movement of either the grinding implement or bottle, one in relation to the other, or of both in relation to one another, generates on the initially spirally ground surface, a reverse spiral furrowing $v$, and the successive longitudinal movements referred to result in the cutting of a spirally furrowed surface on an underlying spirally roughened surface, so that when the grinding is done, the ground, joint-forming surface is broken up into minute but approximately uniformly spaced elevations and depressions, and with the result that all ground bottle-necks of a given size will fit the corresponding sizes of independently ground bottle-stoppers, and vice versa. There may be as many series of spiral furrowings or cuttings as are desired to produce the required finish of the joint-forming surfaces. Each grinding operation begins at one edge or side of the surface to be ground, and is continued to the other edge or side of such surface.

In working the old process, the floating abrasive particles in the abrasive mixture wandered more or less at random, and consequently were not definitely controlled, so that the result was a total lack of uniformity in the joint-forming surfaces of bottle-necks and stoppers not ground in pairs or mates, as above stated.

What I claim is:—

1. The improvement in the art of grinding interchangeable, ground glass bottle necks and ground glass stoppers therefor, consisting in grinding the contacting, joint-forming surfaces thereof uniformly and spirally from edge to edge.

2. The improvement in the art of grinding interchangeable, ground glass bottle necks and ground glass stoppers therefor, consisting in initially grinding the contacting, joint-forming surfaces thereof uniformly and spirally from edge to edge, and in then grinding the initially ground surface from edge to edge, reversely, uniformly and spirally.

CONRAD M. CONRADSON.

Witnesses:
FRANK L. HOWARD,
HENRY R. KENNEDY.